US012694204B2

(12) United States Patent
Kumar et al.

(10) Patent No.: US 12,694,204 B2
(45) Date of Patent: Jul. 28, 2026

(54) SYSTEM AND METHOD FOR COMPARING DOCUMENTS USING AN ARTIFICIAL INTELLIGENCE (AI) MODEL

(71) Applicant: UST Global (Singapore) Pte. Limited, Singapore (SG)

(72) Inventors: Sandeep Sashi Kumar, Thrissur (IN); Rajiv Shanbhag, Sarjapur (IN); Rajani Sreedharan, Ernakulam (IN)

(73) Assignee: UST Global (Singapore) Pte. Limited, Singapore (SG)

( * ) Notice: Subject to any disclaimer, the term of this patent is extended or adjusted under 35 U.S.C. 154(b) by 266 days.

(21) Appl. No.: 18/611,661

(22) Filed: Mar. 20, 2024

(65) Prior Publication Data

US 2024/0320423 A1     Sep. 26, 2024

(30) Foreign Application Priority Data

Mar. 23, 2023     (IN) .............................. 202311020586

(51) Int. Cl.
*G06F 40/194*          (2020.01)
*G06F 40/258*          (2020.01)
(52) U.S. Cl.
CPC .......... *G06F 40/194* (2020.01); *G06F 40/258* (2020.01)

(58) Field of Classification Search
CPC ..................................................... G06F 40/194
See application file for complete search history.

(56) References Cited

U.S. PATENT DOCUMENTS

| | | | |
|---|---|---|---|
| 2019/0347284 A1* | 11/2019 | Roman ................... | G06F 16/93 |
| 2022/0108556 A1* | 4/2022 | Peng ...................... | G06F 40/103 |
| 2022/0215012 A1* | 7/2022 | Rajanigandha ....... | G06F 16/258 |
| 2022/0382728 A1* | 12/2022 | Religa ................... | G06N 20/20 |
| 2022/0414336 A1* | 12/2022 | Abraham ............... | G06N 20/00 |
| 2024/0202435 A1* | 6/2024 | Bajaj ..................... | G06F 40/216 |

* cited by examiner

*Primary Examiner* — Richemond Dorvil
*Assistant Examiner* — Alexander G Marlow

(57)          ABSTRACT

A method for comparing documents using an AI model is disclosed herein. The method includes preprocessing a plurality of input documents into a structured, standardized format for comparison. Further, the method includes generating a layout of components in the plurality of input documents. Furthermore, the method includes generating a canonical representation indicating relationships between the components. Furthermore, the method includes determining sections within each of the plurality of input documents by segmenting the layout Furthermore, the method includes determining a textual difference matrix using the AI model, based on the comparison of the plurality of sections within each of the plurality of input documents, wherein the textual difference matrix indicates alterations in one or more expressions in each of the plurality of sections.

12 Claims, 9 Drawing Sheets

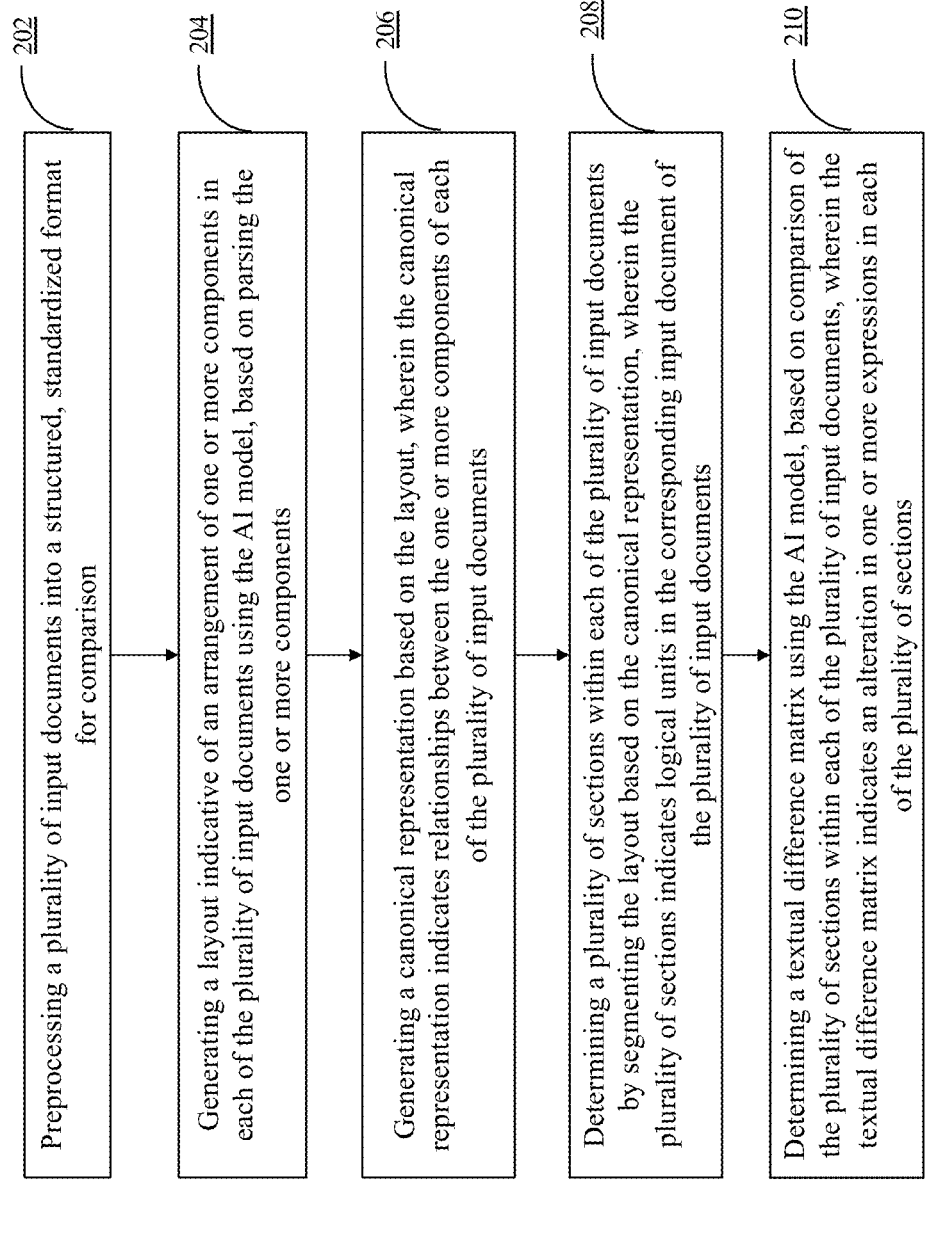

202

Preprocessing a plurality of input documents into a structured, standardized format for comparison

204

Generating a layout indicative of an arrangement of one or more components in each of the plurality of input documents using the AI model, based on parsing the one or more components

206

Generating a canonical representation based on the layout, wherein the canonical representation indicates relationships between the one or more components of each of the plurality of input documents

208

Determining a plurality of sections within each of the plurality of input documents by segmenting the layout based on the canonical representation, wherein the plurality of sections indicates logical units in the corresponding input document of the plurality of input documents

210

Determining a textual difference matrix using the AI model, based on comparison of the plurality of sections within each of the plurality of input documents, wherein the textual difference matrix indicates an alteration in one or more expressions in each of the plurality of sections

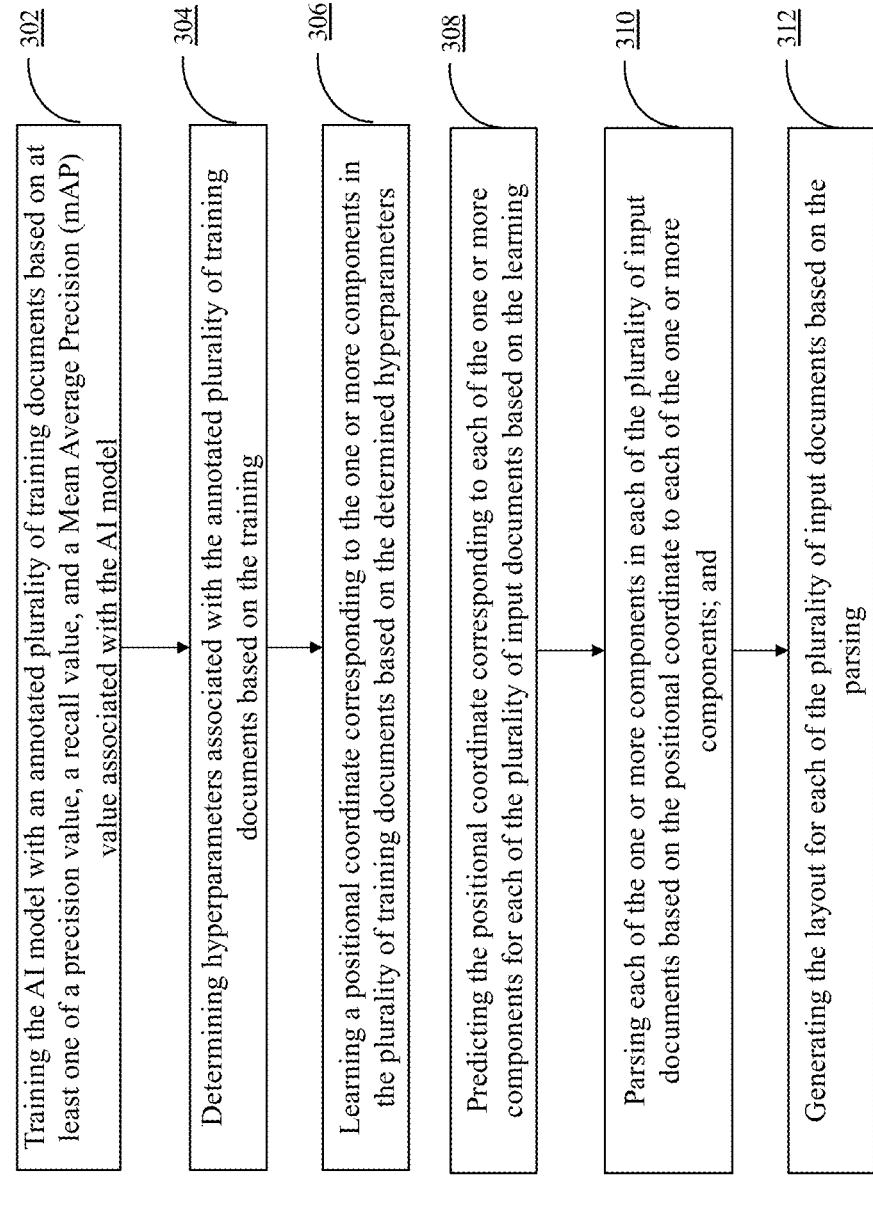

302
Training the AI model with an annotated plurality of training documents based on at least one of a precision value, a recall value, and a Mean Average Precision (mAP) value associated with the AI model 304
Determining hyperparameters associated with the annotated plurality of training documents based on the training 306
Learning a positional coordinate corresponding to the one or more components in the plurality of training documents based on the determined hyperparameters 308
Predicting the positional coordinate corresponding to each of the one or more components for each of the plurality of input documents based on the learning 310
Parsing each of the one or more components in each of the plurality of input documents based on the positional coordinate to each of the one or more components; and 312
Generating the layout for each of the plurality of input documents based on the parsing

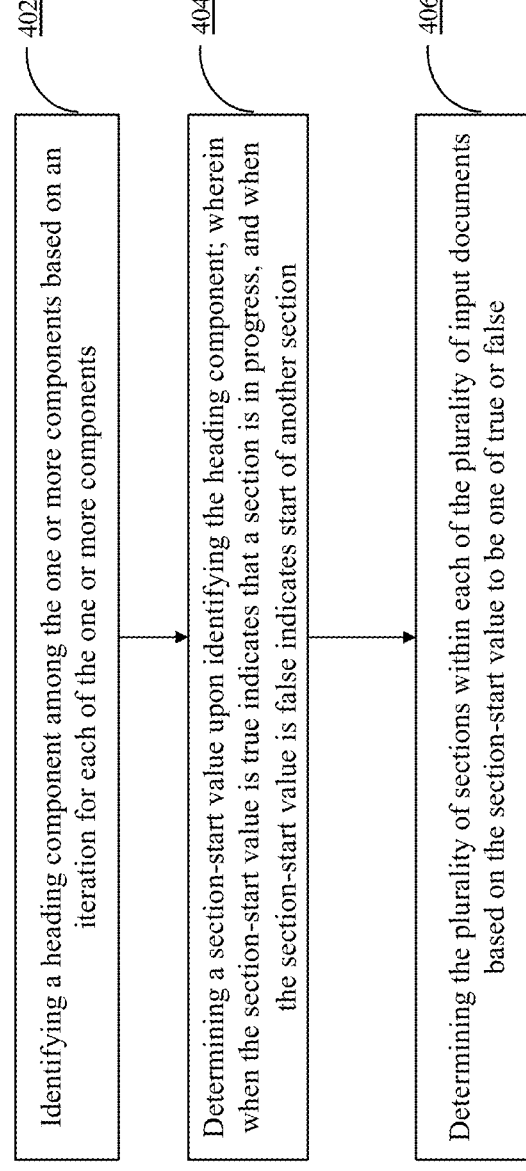

402

Identifying a heading component among the one or more components based on an iteration for each of the one or more components

404

Determining a section-start value upon identifying the heading component; wherein when the section-start value is true indicates that a section is in progress, and when the section-start value is false indicates start of another section

406

Determining the plurality of sections within each of the plurality of input documents based on the section-start value to be one of true or false

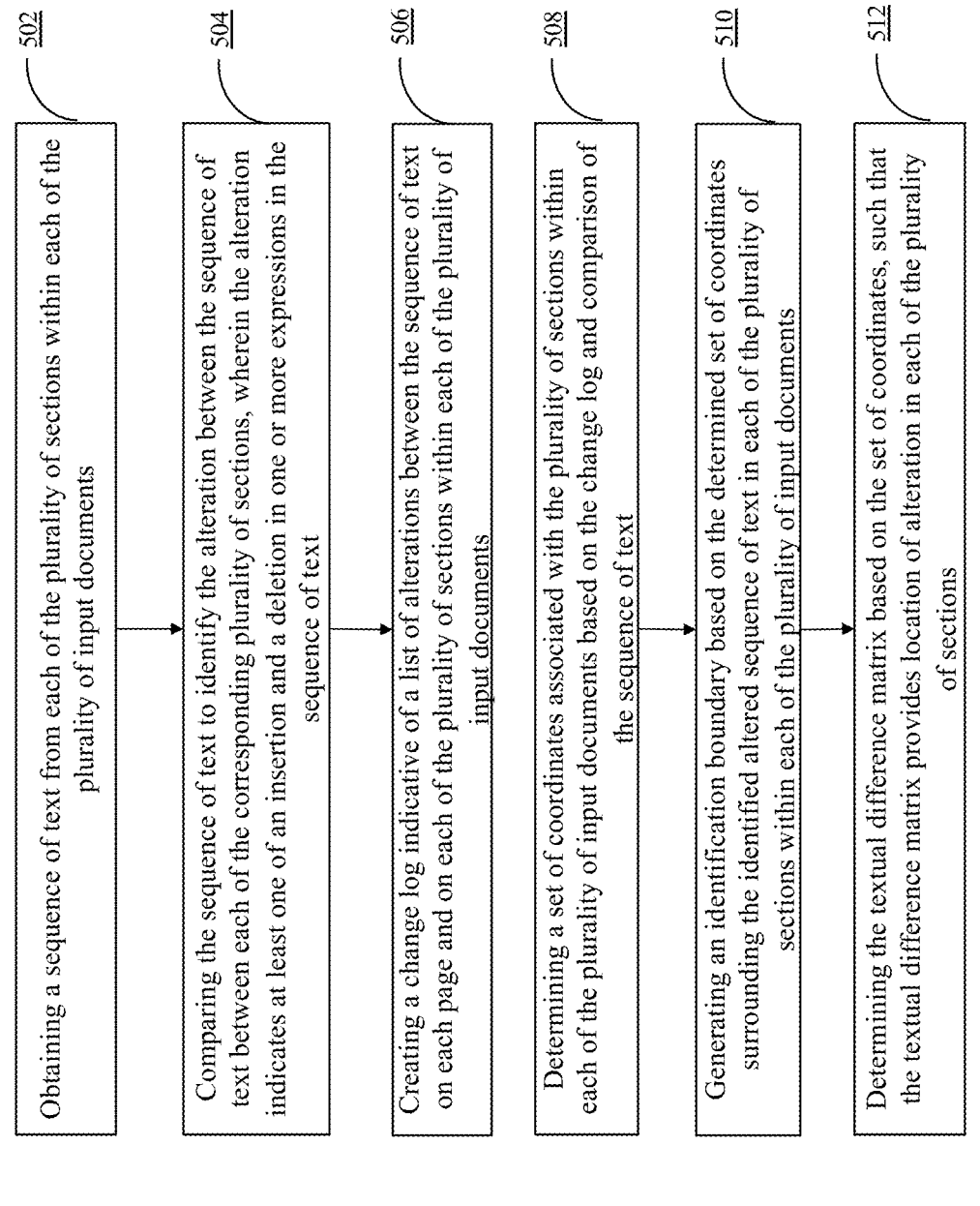

502

Obtaining a sequence of text from each of the plurality of sections within each of the plurality of input documents

504

Comparing the sequence of text to identify the alteration between the sequence of text between each of the corresponding plurality of sections, wherein the alteration indicates at least one of an insertion and a deletion in one or more expressions in the sequence of text

506

Creating a change log indicative of a list of alterations between the sequence of text on each page and on each of the plurality of sections within each of the plurality of input documents

508

Determining a set of coordinates associated with the plurality of sections within each of the plurality of input documents based on the change log and comparison of the sequence of text

510

Generating an identification boundary based on the determined set of coordinates surrounding the identified altered sequence of text in each of the plurality of sections within each of the plurality of input documents

512

Determining the textual difference matrix based on the set of coordinates, such that the textual difference matrix provides location of alteration in each of the plurality of sections

SYSTEM AND METHOD FOR COMPARING DOCUMENTS USING AN ARTIFICIAL INTELLIGENCE (AI) MODEL

FIELD

The present disclosure relates generally to document comparison techniques, and more specifically, to a method and a system to compare documents including invisible content in the document using an Artificial Intelligence (AI) model.

BACKGROUND

In the ever-evolving landscape of industries such as legal, financial, healthcare, and education, the importance of document comparison cannot be overstated. The document comparison is a pivotal process that involves scrutinizing two or more documents to unveil both the differences and similarities between them. However, this task becomes increasingly challenging when dealing with extensive volumes of data, leading to a demand for innovative solutions that streamline the process and enhance accuracy.

Historically, document comparison relied heavily on manual inspection or basic software tools that merely highlighted differences between documents. In the manual comparison approach, human oversight is essential. This not only introduces the potential for human error but also consumes valuable time that could be better utilized in more strategic and analytical aspects of the business. Further, while these methods served a purpose, they were inherently limited in their capacity to accurately identify changes and provide meaningful insights. The shortcomings of traditional solutions became particularly apparent when confronted with the need for selective comparisons, such as section-to-section, table-to-table, and comparisons that include or exclude headers and footers in the documents.

One glaring issue with traditional document comparison tools is their consideration of an invisible layer of text within the documents, a feature that proves undesirable in the operations of organizations and enterprises. This inherent flaw can lead to errors, compromising the integrity of the comparison process and, by extension, the decisions made based on these comparisons. As industries continue to grapple with the challenges posed by these limitations, a compelling need arises for an advanced document comparison solution that can effectively and efficiently address these technical problems.

Further, the limitations of traditional document comparison tools or approaches may go beyond their inability to perform selective comparisons and consideration of an invisible layer of text. Furthermore, traditional document comparison tools often struggle to scale effectively when faced with large volumes of data. The manual or basic software-based approaches may become impractical and time-consuming, hindering productivity and efficiency.

Moreover, documents in modern industries are often complex, featuring intricate formatting, graphics, and multimedia elements. Traditional document comparison tools may falter when it comes to accurately comparing such elements, resulting in incomplete or inaccurate insights. Different industries have unique requirements for document handling and comparison. Traditional document comparison tools, being generic, may lack the flexibility to adapt to specific industry standards, legal frameworks, or regulatory compliance needs.

Also, many traditional document comparison tools may lack effective version control mechanisms. In scenarios where multiple versions of documents exist, maintaining clarity on changes made over time becomes challenging, leading to confusion and potential errors in the comparison process.

Additionally, in a globalized world, documents may contain content in multiple languages. Traditional document comparison tools may struggle to handle multilingual comparisons accurately, potentially overlooking differences or inaccurately identifying them due to language nuances. The traditional document comparison tools, especially those relying on manual processes, may have a steep learning curve. This may result in delays as users invest significant time in becoming proficient with the tool, hindering the quick adoption of document comparison practices. Furthermore, traditional document comparison tools often focus on highlighting differences without providing deeper analytical insights.

Recognizing and addressing these limitations is crucial for industries aiming to optimize their document comparison processes.

Thus, there is a need to identify solutions to the above-mentioned limitations of the traditional document comparison tools.

SUMMARY

According to some implementations of the present disclosure, a system for comparing documents using an artificial intelligence (AI) model is disclosed. The system includes a memory and at least one processor in communication with the memory. The at least one processor is configured to preprocess a plurality of input documents into a structured, standardized format for comparison. Further, the at least one processor is configured to generate a layout indicative of an arrangement of one or more components in each of the plurality of input documents using the AI model, based on parsing the one or more components. Furthermore, the at least one processor is configured to generate a canonical representation based on the layout, wherein the canonical representation indicates relationships between the one or more components of each of the plurality of input documents. Furthermore, the at least one processor is configured to determine a plurality of sections within each of the plurality of input documents by segmenting the layout based on the canonical representation, wherein the plurality of sections indicates logical units in the corresponding input document of the plurality of input documents. Furthermore, the at least one processor is configured to determine a textual difference matrix using the AI model, based on the comparison of the plurality of sections within each of the plurality of input documents, wherein the textual difference matrix indicates alteration in one or more expressions in each of the plurality of sections.

According to some implementations of the present disclosure, a method for comparing documents using an artificial intelligence (AI) model is disclosed. The method includes preprocessing a plurality of input documents into a structured, standardized format for comparison. Further, the method includes generating a layout indicative of an arrangement of one or more components in each of the plurality of input documents using the AI model, based on parsing the one or more components. Furthermore, the method includes generating a canonical representation based on the layout, wherein the canonical representation indicates relationships between the one or more components of each of the plurality of input documents. Furthermore, the method includes determining a plurality of sections within each of the plurality of input documents by segmenting the layout based on the canonical representation, wherein the plurality of sections indicates logical units in the corresponding input document of the plurality of input documents. Furthermore, the method includes determining a textual difference matrix using the AI model, based on the comparison of the plurality of sections within each of the plurality of input documents, wherein the textual difference matrix indicates alterations in one or more expressions in each of the plurality of sections.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 2 illustrates a flow diagram depicting a method for comparing input documents using an artificial intelligence (AI) model, according to some embodiments of the present invention;

FIG. 3 illustrates a flow diagram depicting a method for generating a layout for each of the input documents, according to some embodiments of the present invention;

FIG. 4 illustrates a flow diagram depicting a method for determining sections within each of the input documents, according to some embodiments of the present invention;

FIG. 5 illustrates a flow diagram depicting a method for determining a textual difference matrix for determining an alteration in expressions by comparing the input documents, according to some embodiments of the present invention;

Figure 1:
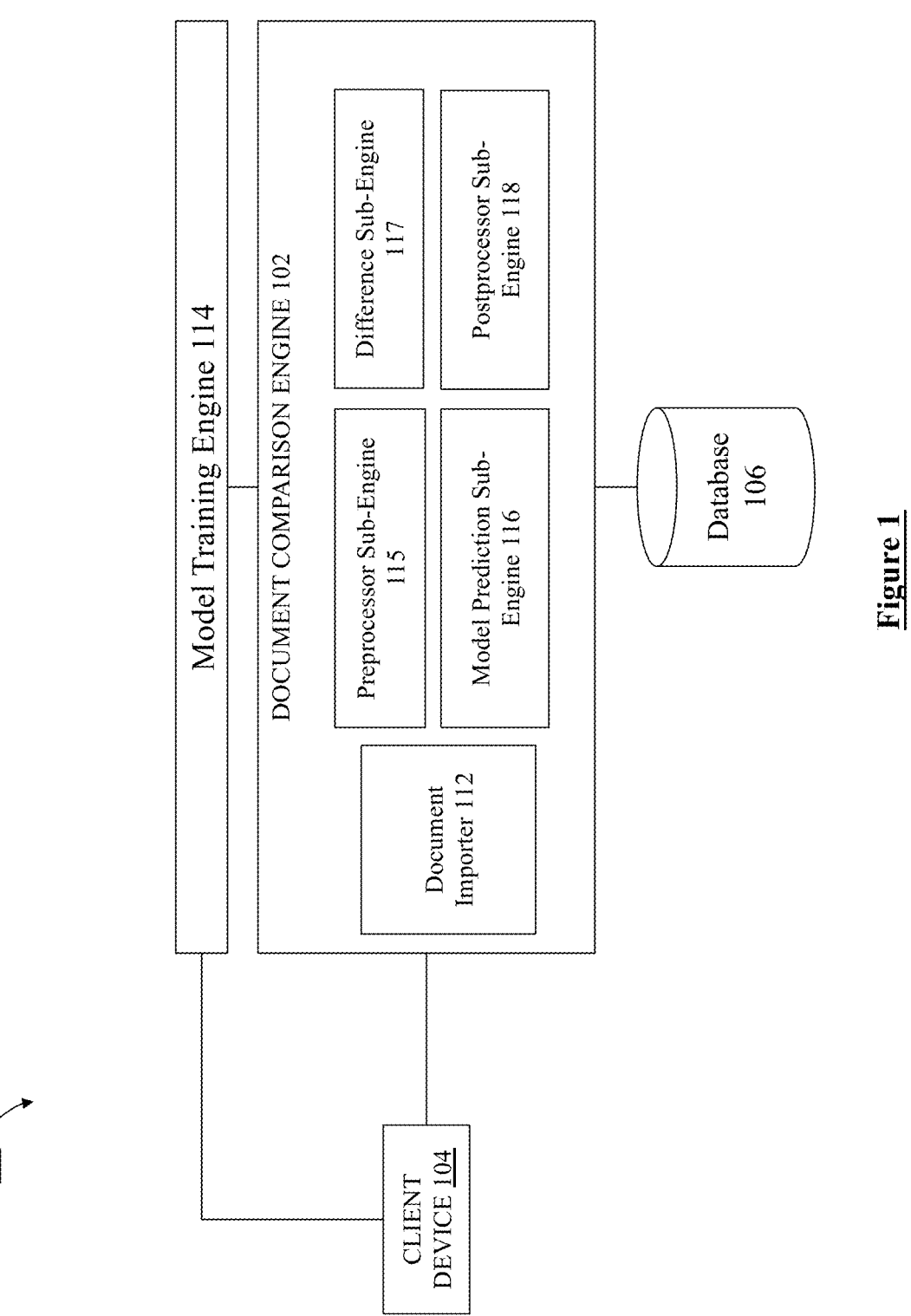
FIG. 1 illustrates a block diagram of an exemplary document comparison system, according to an embodiment of the present invention.

The present disclosure is susceptible to various modifications and alternative forms. Some representative embodiments are shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings and will herein be described in detail. The present disclosure is an example or illustration of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present invention describes a method for comparing input documents using an artificial intelligence (AI) model. The present invention includes preprocessing a set of input documents by converting the set of input documents into a structured and standardized format suitable for comparison purposes. Further, the present invention includes generating a layout that represents the arrangement of various components within each input document among the set of input documents. This layout is derived by parsing the components present in the set of input documents. Further, the present invention includes a canonical representation created for the layout to outline the relationships between the components in each of the input documents. Furthermore, the present invention includes segmenting the layout based on the canonical representation to determine a plurality of sections within each input document. Furthermore, the present invention includes utilizing the AI model to determine a textual difference matrix. This textual difference matrix may be derived from comparing the plurality of sections within each input document. The textual difference matrix highlights alterations or differences in one or more expressions within each section, providing a detailed overview of textual discrepancies in the set of input documents.

FIG. 1 illustrates a block diagram of an exemplary document comparison system, according to an embodiment of the present invention. To simplify the discussion, the singular form will be used for components identified in FIG. 1 when appropriate, but the use of the singular does not limit the discussion to only one of each such component. The system 100 may include a client device 104, a document comparison engine 102, a model training engine 114 and a database 106. Each of these components can be realized by one or more computer devices and/or networked computer devices. The computer devices include at least one processor with at least one non-transitory computer-readable medium.

The client device 104 is any computing device that can provide commands or the set of input documents or that can communicate with the document comparison engine 102 and request the document comparison engine 102 to perform the comparison of the set of input documents. In an embodiment, the client device 104 may also provide the document comparison engine 102 at least one of, one or more document images, or one or more input documents (of the set of input documents) for comparing the set of input documents among each other. In an example, the client device 104 may include a laptop computer, a desktop computer, a smartphone, a smart speaker, a smart television, a scanner, a PDA, etc.

The document comparison engine 102 may be in communication with the database 106 for storage of various parameters, the set of documents, and configuration data. For example, model parameters for the machine-learned model may be stored in the database 106, the set of documents may be stored in the database 106, document classification settings can be stored in the database 106, labelled data may be stored in the database 106 may be stored in the database 106, etc.

In an embodiment, the document comparison engine 102 corresponds to the artificial intelligence (AI) model for comparing the set of input documents. The document comparison engine 102 may include a document importer 112, a preprocessor sub-engine 115, a model prediction sub-engine 116, a difference sub-engine 117, and a postprocessor sub-engine 118. Further, the document comparison engine 102 may be in communication with the model training engine 114. An engine or sub-engine is a combination of hardware and software configured to perform specific functionality, as discussed throughout this disclosure. The document comparison engine 102 is configured to receive instructions from the client device 104 for comparing the set of input documents. In an example, the document comparison engine 102 provides an output by highlighting the alteration in the one or more expressions such that the highlighted alteration in each of the set of input documents is displayed on a screen of the client device 104.

In some implementations, the document comparison engine 102 does not have to know the type of documents being compared. Each of the document importer 112, the model training engine 114, and the model prediction sub-engine 116 identified in FIG. 1 is a combination of hardware and software configured to perform specific functionality as described in the following paragraphs.

In an embodiment, the document comparison engine 102 includes the document importer 112. The document importer 112 is configured to interrogate the set of input documents to be compared based on the file format. In an example, the set of input documents may be provided in different file formats. For example, the set of input documents may be provided in an image format (e.g., portable network graphics (PNG) format, tagged image file format (TIFF), Silicon Graphics image file (RGB), graphic interchange format (GIF), portable bitmap formats (e.g., PBM, PGM, PPM), Sun raster bitmap image file format (RAST), raster image file formats (e.g., EXR), JPEG, bitmap formats (e.g., BMP, XBM), etc.), in a video format (e.g., WebP file format), or in any other document format (e.g., portable document format (PDF), open document format (ODF), Microsoft® Word document (DOC), Microsoft® Word Open XML format (DOCX), etc.). In an example, the document importer 112 may include OCR for recognizing text in image files.

In another embodiment, the model training engine 114 trains the AI model using training data. The model prediction sub-engine 116 uses the trained AI model for comparing the set of input documents and providing the output to the client device 104. For example, the model training engine 114 may receive the training documents from the document importer 112 to train the AI model, and the model prediction sub-engine 116 can receive documents from the document importer 112 for comparing the set of input documents using the trained AI model. In an example, the model training engine 114 trains the AI model using a using a deep learning convolutional network for instance, YOLO. Further, other region-based algorithms such as Region Convolutional Neural Network (R-CNN), Fast R-CNN, Faster R-CNN, Mask R-CNN may be implemented for training the AI model.

In an embodiment, the preprocessor sub-engine 115 may be configured to receive the set of input documents and initiate preprocessing of the set of input documents into structured, standardized format for comparison. Further, the model prediction sub-engine 116 may be configured to compare the set of input documents. Furthermore, the difference sub-engine 117 may be configured for identifying the differences in the set of input documents. Furthermore, the postprocessing sub-engine 118 may be configured to generate word-level modifications for each word within the set of input documents. Consequently, the modifications may be translated from the word level to the component level, and metadata stores information about such modifications. Furthermore, a detailed explanation related to each of the sub-engines is explained in forthcoming paragraphs.

FIG. 2 illustrates a flow diagram depicting a method 200 for comparing input documents using an artificial intelligence (AI) model, according to some embodiments of the present invention. In an example, the steps in FIG. 2 may be implemented by the client device 104, the document comparison engine 102, or both.

At step 202, the method 200 may include the document comparison engine 102 in cooperation with the client device 104, which is configured to receive the set of input documents and initiate preprocessing of the set of input documents into a structured, standardized format for comparison. The plurality of input documents may alternatively be referred to as the set of input documents within the scope of the present invention. Further, the set of input documents corresponds to the documents received from the client device 104 for comparison.

In an example, the set of input documents may be received in various formats and structures for instance, having own unique features and complexities as the set of input documents may be sourced from different industries or contexts. In the example, the preprocessing step may involve normalizing the content of the set of input documents for instance, tasks such as standardizing text formatting, removing unnecessary formatting variations, and ensuring consistent representation of textual elements. Further, in the example, the set of input documents may contain various components such as text, tables, images, headers, footers, and more. The preprocessing step involves addressing these components in a manner that preserves their integrity while preparing them for comparison. In an advantageous aspect of the present step, the preprocessing step ensures that the set of input documents may be compatible with the AI model's requirements, for instance, including encoding or representing document features in a way that the AI model may effectively parse and analyze. Furthermore, by standardizing the format of the set of input documents, the preprocessing step enhances the consistency of the comparison process such that the AI model interprets and compares documents uniformly, reducing the potential for errors or inaccuracies introduced by document format variations. Furthermore, the preprocessing step may include data cleaning tasks to address inconsistencies, inaccuracies, or missing information, ensuring that the comparison process may be based on reliable data. Thus, preprocessing aims to optimize the efficiency of the document comparison process by preparing the set of input documents in a structured and standardized format, the subsequent steps may be executed more efficiently, saving computational resources and time.

At step 204, the method 200 may include generating the layout. In an example, the layout may be indicative of an arrangement of one or more components in each of the set of input documents created using the AI model. In the example, the layout may be generated by the AI model by parsing the one or more components present in the set of input documents. Further, in the example, the one or more components may be alternatively referred as components for the sake of brevity and may refer to distinct elements or parts within a document among the set of input documents that may contribute to the structure or content of the document. The components may vary depending on the nature/type of the documents being compared but typically encompass various elements that make up the document's layout and content. In a non-limiting example, for instance, components may be text blocks, tables, images, headers & footers, lists, and sections. The AI model may be configured to parse and understand the components within each document among the set of input documents. Thus, by analyzing and recognizing the layout and relationships between the components, the AI model may be configured to generate a structured representation of the document. Therefore, the structured representation may form the basis for further comparison and analysis to identify textual differences and alterations between the set of input documents. A detailed explanation for generating the layout is explained in FIG. 3.

At step 206, the method 200 may include generating the canonical representation based on the layout. In an example, the canonical representation may refer to relationships between the components of each of the set of input documents being compared.

In an example, the canonical representation may be generated based on the layout of the set of input documents. The layout refers to the arrangement of different components, such as text blocks, tables, images, headers, footers, and other elements, within each document. Thus, the AI model may be configured to parse the layout and identify relationships between the components. In the example, the relationships may include the spatial arrangement of elements, hierarchical structures, or any other patterns that convey the interaction of the components with each other. Therefore, by creating the canonical representation, the method 200 may provide a structured and standardized understanding of the component's organization and relation within each document. This structured representation may serve as a foundation for subsequent analysis and comparison.

Further, in an advantageous aspect, the generation of the canonical representation may be instrumental in the process of segmentation or for the determination of the plurality of sections, wherein the layout is divided into logical units or sections. The established relationships in the canonical representation may guide the determination of the plurality of sections, ensuring that the resulting sections align with the inherent structure of the documents. Thus, the canonical representation may create a consistent framework for comparing documents, establishing a common basis for understanding the structure and relationships within each document, and facilitating a more accurate and meaningful comparison.

At step 208, the method 200 may include determining the plurality of sections within each of the set of input documents. For the sake of brevity, the plurality of sections may alternatively be referred to as the sections. In an example, the AI model may be configured to determine the sections by segmenting the layout based on the canonical representation. In the example, the sections may indicate logical units in the corresponding document among the set of input documents. In the example, the logical units may be determined by factors such as content type, formatting, or any other criteria specified by the canonical representation. Thus, the method 200 may aim to create meaningful and contextually relevant sections that capture the inherent structure of the documents. A detailed explanation for determining the sections is explained in FIG. 4.

In an advantageous aspect of the step, the determination of sections ensures a consistent approach across each of the set of input documents. Thus, by aligning the sections with the established relationships in the canonical representation, the method 200 may maintain coherence and relevance in defining logical units within each document. Further, the determination of the sections within each document enhances the precision of the comparison process. For instance, instead of comparing entire documents as monolithic entities, the method 200 may focus on comparing specific sections of the document. This allows for a more granular analysis of textual differences and alterations within the logical units of each document.

At step 210, the method 200 may include determining the textual difference matrix using the AI model. In an example, based on comparing the sections within each of the set of input documents the AI model may be configured to determine the textual difference matrix. In the example, the textual difference matrix may refer to the alteration in expressions in each of the sections. In a non-limiting example, the expressions may indicate words, sentences, special characters, and formulae in the document. A detailed explanation for determining the textual difference matrix is explained in FIG. 5.

Further, the method 200 may include highlighting the alteration in the expressions and displaying the highlighted alteration in each of the input documents such that the highlighted alteration indicates differences between the plurality of input documents. In an example, the highlighting may be referred to could involve visually marking or emphasizing the altered portions within the document. Thus, the highlighting may be essential for providing a clear and easily interpretable representation of the differences between the compared set of input documents.

In an advantageous aspect, the highlighted alterations may be consistently represented across each of the sets of input documents. This ensures that the alterations are uniformly highlighted in each document, providing a standardized way to visually perceive the differences. Further, in the example, the display of the highlighted alteration may be designed to be user-friendly, making it easy for individuals to interpret and comprehend the differences. In the example, the highlighting may use intuitive visual cues or annotations or bounding colored boxes (referred to in FIG. 6b) to draw attention to the specific areas of alteration. Thus, by visually emphasizing the areas where alteration or changes have occurred, the method 200 may provide an efficient means for users to grasp the variations and understand the extent of alterations. For instance, a legal professional may quickly identify changes in contracts or agreements, while financial analysts may pinpoint alterations in financial statements, aiding in informed decision-making using the present invention.

A detailed explanation of each of the above steps is provided in FIG. 3, FIG. 4, and FIG. 5.

FIG. 3 illustrates a flow diagram depicting a method 300 for generating the layout for each of the input documents, according to some embodiments of the present invention. The method 300 may be implemented through the document comparison engine 102.

At step 302, the method 300 may include training the AI model with an annotated plurality of training documents. In an example, the plurality of training documents may be labelled with information that guides the AI model in learning the relationships and positional coordinates of the components within the documents. Further, in the example, The training of the AI model may be guided by performance metrics such as precision, recall, and Mean Average Precision (mAP). The performance metrics may help evaluate and improve the accuracy and effectiveness of the AI model.

At step 304, the method 300 may include determining hyperparameters associated with the annotated plurality of training documents. In an example, the hyperparameters may be determined based on the characteristics and features of the annotated plurality of training documents used during the training step above.

At step 306, the method 300 may include learning a positional coordinate corresponding to the components in the plurality of training documents based on the determined hyperparameters thus, the AI model may adapt to the specific characteristics of the annotated plurality of training documents.

At step 308, the method 300 may include predicting the positional coordinate corresponding to each of the more components for each of the plurality of input documents based on the learning during the training step above.

At step 310, the method 300 may include parsing each of the components in each of the plurality of input documents based on the predicted positional coordinates. Thus, in an advantageous aspect, the parsing of the components ensures precision in identifying and delineating the boundaries of individual components within the documents.

At step 312, the method 300 may include generating the layout for each of the plurality of input documents based on the parsed components.

FIG. 4 illustrates a flow diagram depicting a method for determining sections within each of the input documents, according to some embodiments of the present invention. The method 400 may be implemented through the document comparison engine 102.

At step 402, the method 400 may include identifying a heading component among the components based on an iteration for each of the components. In an example, each component in the document may be iteratively examined including elements like paragraphs, tables, images, etc. The AI model may be configured to identify for each component whether the component qualifies as a heading. The Heading may typically serve as an indicator of the beginning of a new section within the document. In an advantageous aspect, the identification of the heading component may be a critical step in understanding the structural hierarchy of the document.

At step 404, the method 400 may include determining a section-start value upon identifying the heading component. In an example, the section-start value refers to the binary indicator with a true or false state. In the example, the true section-start value signifies that the section may be currently in progress. Thus, the AI model may have detected the heading component, and the content following the heading component is part of the ongoing section. Alternatively, the false section-start value may indicate the start of another section. Thus, indicating that the AI model may have identified a new heading component, marking the beginning of a different section within the document.

At step 406, the method 400 may include determining the plurality of sections within each of the plurality of input documents based on the section-start value to be one of true or false. In an example, the section-start value being true or false may then be utilized to dynamically determine the plurality of sections within each input document. In the example, when the section-start value is true, it indicates that the AI model is analysing within the boundaries of the section. This continues until the false section-start value may be encountered, thus, signalling the start of another section/new section. In an advantageous aspect, by utilizing the section-start value, the method 400 may logically define and identify the plurality of sections within the input documents thus, resulting in a structured segmentation of the document into meaningful units based on the presence of headings.

FIG. 5 illustrates a flow diagram depicting a method 500 for determining the textual difference matrix for determining the alteration in expressions by comparing the input documents, according to some embodiments of the present invention. The method 400 may be implemented through the document comparison engine 102.

At step 502, the method 500 may include obtaining a sequence of text from each of the plurality of sections within each of the plurality of input documents. In an example, obtaining the sequence of text may refer to capturing the content within each of the plurality of sections, thus forming a sequential representation of the text content.

At step 504, the method 500 may include comparing the sequence of text to identify the alteration between the sequence of text between each of the corresponding plurality of sections. In an example, the alteration may refer to at least one insertion and a deletion in the expressions within the sequence of text. Thus, in the example, the present comparing step may pinpoint where changes or alternations have occurred, indicating whether there's new content i.e., the insertion or the content has been removed i.e., the deletion.

At step 506, the method 500 may include creating a change log. In an example, the change log may be created to store the alterations identified in the previous step. The change log may serve as a list that captures the specifics of each alteration within the sequence of text. Thus, the change log may indicate whether an alteration involves the insertion or the deletion, providing insights into the nature of the change within each of the plurality of input documents.

At step 508, the method 500 may include determining a set of coordinates associated with the plurality of sections within each of the plurality of input documents based on the change log and comparison of the sequence of text. Thus, the set of coordinates may be associated with the plurality of sections within each input document. In an advantageous aspect, the set of coordinates may help in mapping the spatial location associated with the alteration within each section, thus providing a detailed understanding of where changes have occurred.

In the method 500, the AI model may be configured to identify words and their coordinates within each component. Thus, creating a page data structure, indicating a structured representation of the content and coordinates of words, and saving it to the database 106. In an advantageous aspect, the creation of the page data structure establishes a foundation for tracking and analysing the alteration at the word level.

In the method 500, the AI model may be configured to retrieve the page data structure from the database 106. The AI model or the document comparison engine 102, may be responsible for comparing the content of the two documents (the set of input documents) and identifying differences.

At step 510, the method 500 may include generating an identification boundary based on the set of coordinates surrounding the identified altered sequence of text in each of the plurality of sections within each of the plurality of input documents. An illustration of the identification boundary is exemplified in FIG. 6a.

At step 512, the method 500 may include determining the textual difference matrix based on the set of coordinates, such that the textual difference matrix provides location of alteration in each of the plurality of sections. In an example, the textual difference matrix may provide a structured representation of the alterations in each of the plurality of sections. In the example, the textual difference matrix may include information about the location and nature of changes, allowing for a comprehensive analysis of textual differences.

In the method 500, the textual difference matrix may also include a section tracker to keep track of each component's words and their positions on a page associated with the document (within the set of input documents). Thus, in an advantageous aspect, the section tracker may be crucial for maintaining the context of alterations.

In an example, the result of the AI model comparing the content of the two documents may be mapped to each word in the page of a first document among the set of input documents. Further, the AI model may be configured to update metadata linking equal words to a second document among the set of input documents being compared, in the page data structure, and the updated structure is saved to the database 106. Thus, in an advantageous aspect, the present step establishes a connection between the words in the first document and their corresponding equivalents in the second document.

Furthermore, the result of the AI model comparing the content of the two documents may be mapped to each word in the page of the second document. Further, the AI model may be configured to update metadata linking equal words to the first document in the page data structure, and the updated structure is saved to the database 106. Thus, in an advantageous aspect, the present step ensures a comprehensive mapping of alterations in both documents (the set of input documents being compared).

Furthermore, the AI model may be configured to retrieve the updated page data structure from the database 106 as part of the textual difference matrix. Additionally, each page of the documents (the set of input documents being compared) may be iterated to the above steps to determine the textual difference matrix. Thus, the textual difference matrix indicates the tracker created to monitor words in the pages of both documents (the set of input documents being compared). Thus, in an advantageous aspect, the present step provides a tracking mechanism likely to assist in further analysis and presentation of alterations.

Figure 6A:
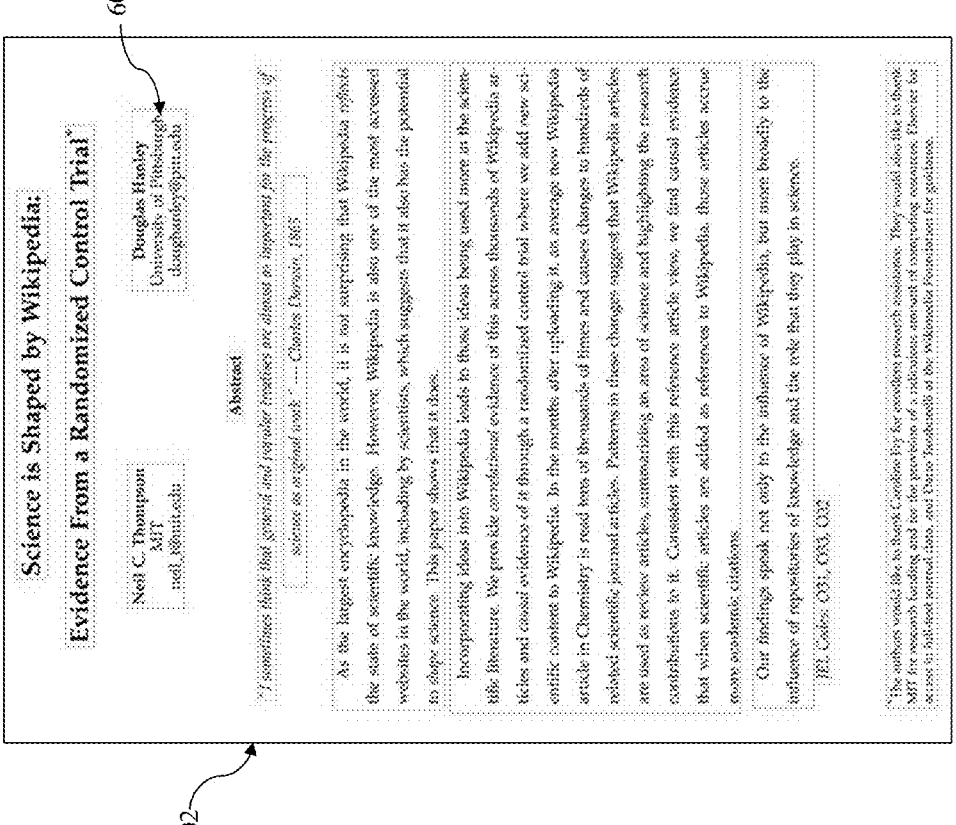
FIG. 6a illustrates an exemplary document with generated identification boundaries, according to some embodiments of the present invention.

To illustrate some advantages of some implementations of the present disclosure, an example is discussed herein. FIG. 6a illustrates an exemplary document with generated identification boundaries, according to some embodiments of the present invention. As illustrated, the identification boundaries 604 are generated across the plurality of sections in the document 602.

Figure 6B:
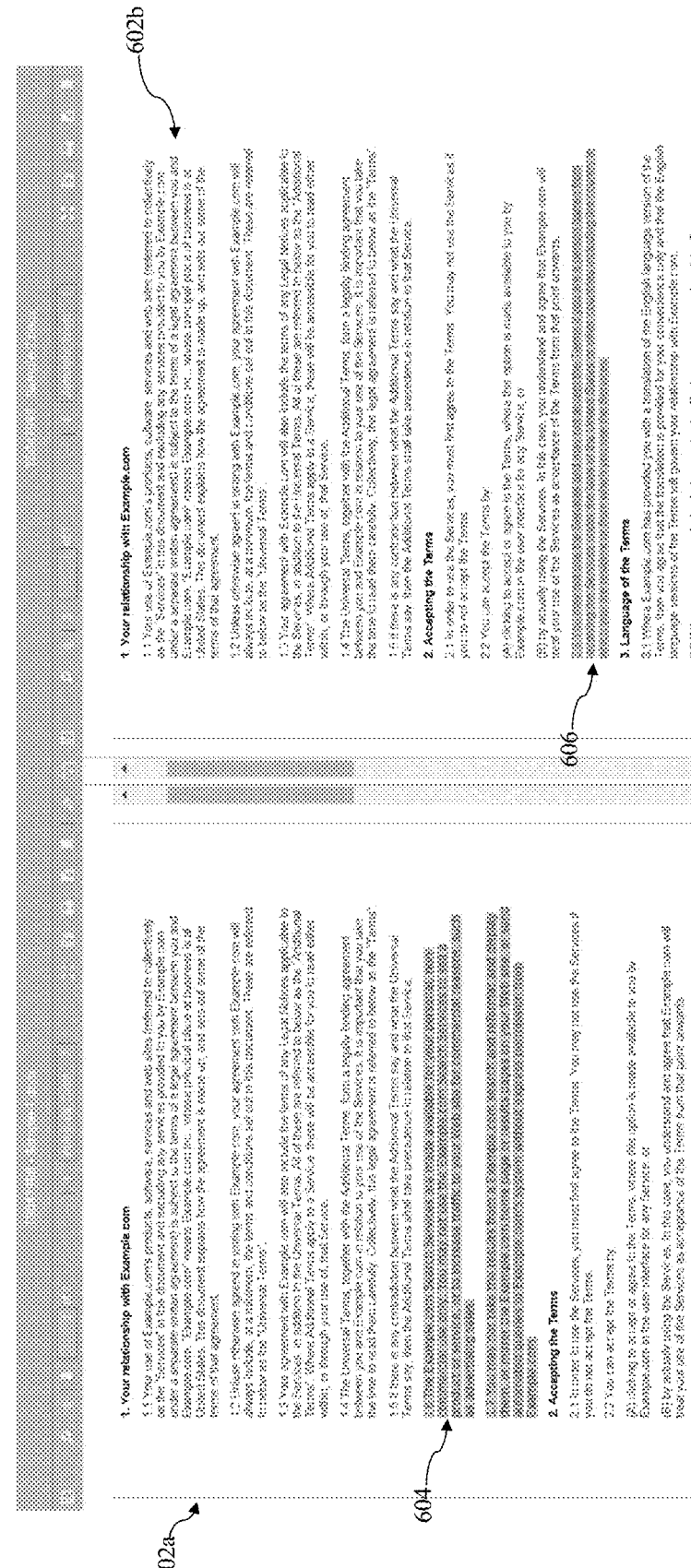
FIG. 6b illustrates an exemplary input documents being compared, according to some embodiments of the present invention.

Similarly, FIG. 6b illustrates an exemplary set of input documents being compared, according to some embodiments of the present invention. As illustrated, 602a represents the first document and 602b represents the second document, i.e., the set of input documents being compared. The first convolutional neural network processes the image document 302. In the example, 604 represents the identification boundaries being highlighted to identify the alterations. The highlighted alteration 606 may be displayed as illustrated, in the documents 602a and 602b (the set of input documents being compared) such that the highlighted alteration 606 may indicate differences between the plurality of input documents upon comparison.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The client device 104 or the computing device as mentioned in the application can include a set of instructions that can be executed to cause the computer system to perform any one or more of the methods disclosed. The computer system may operate as a standalone-device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system can also be implemented as or incorporated across various devices, such as a personal computer (PC), a tablet PC, a personal digital assistant (PDA), a mobile device, a palmtop computer, a laptop computer, a desktop computer, a communications device, a web appliance, a network router, switch or bridge, or any other machine capable of executing a set of instructions (sequential or otherwise) that specify actions to be taken by that machine. Further, while a single computer system is illustrated, the term "system" shall also be taken to include any collection of systems or sub-systems that individually or jointly execute a set, or multiple sets, of instructions to perform one or more computer functions.

The network as referred to in the application may include wired networks, wireless networks, Ethernet AVB networks, or combinations thereof. The wireless network may be a cellular telephone network, an 802.11, 802.16, 802.20, 802.1Q or WiMax network. Further, the network may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

Figure 7:
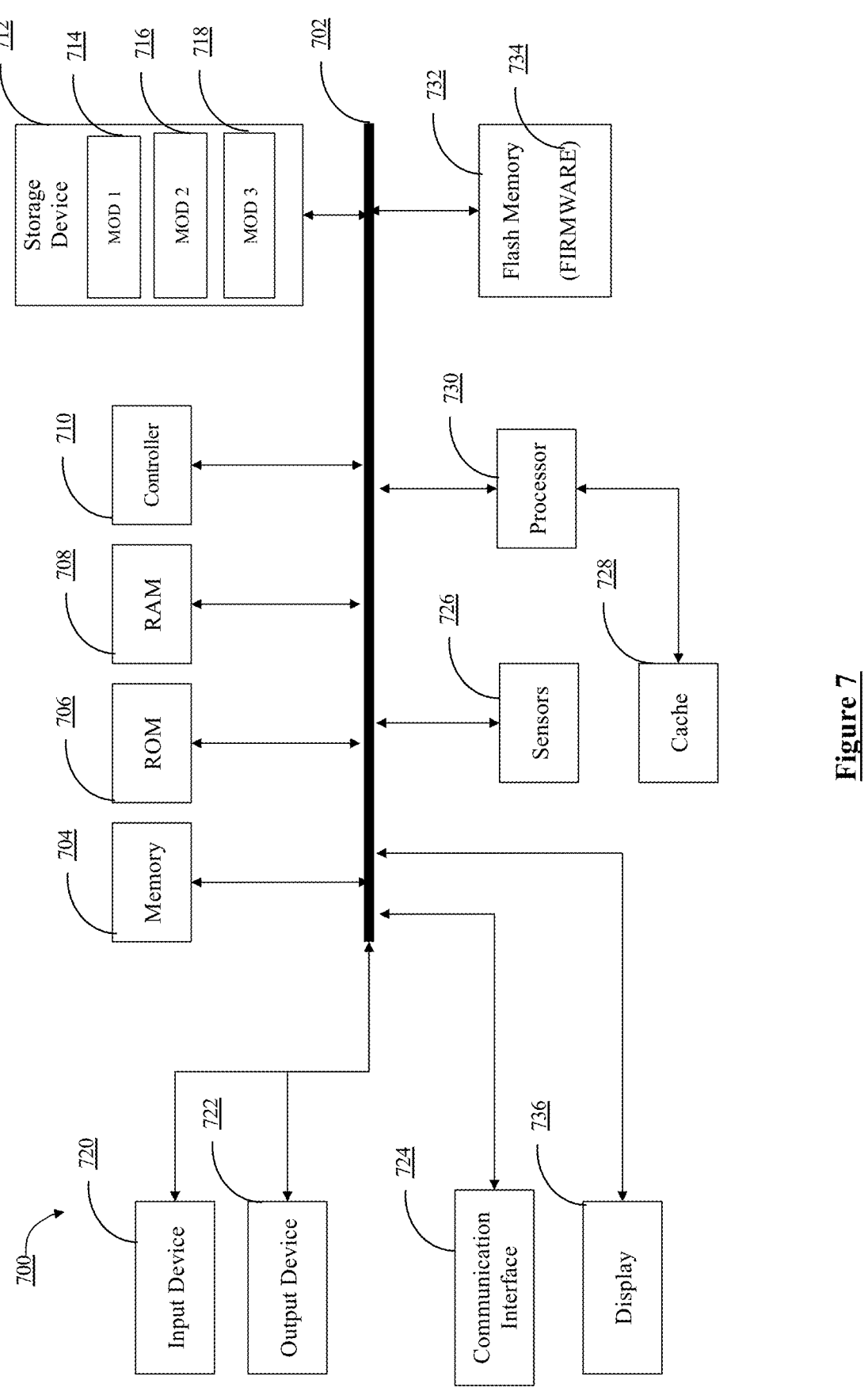
FIG. 7 illustrates an exemplary computer system, according to some embodiments of the present invention.

FIG. 7 illustrates an exemplary computing system 700, according to some embodiments of the present invention. The computing system 700 includes the components of the computing system in electrical communication with each other using a bus 702. The system 700 includes a processing unit (CPU or processor) 730, and a system bus 702 that couples various system components, including the system memory 704 (e.g., read only memory (ROM) 706 and random-access memory (RAM) 708), to the processor 730. The system 700 may include a cache of high-speed memory connected directly with, in proximity to, or integrated as part of the processor 730. The system 700 can copy data from the memory 704 and/or the storage device 712 to the cache 728 for quick access by the processor 730. In this way, the cache 728 may provide a performance boost for processor 730 while waiting for data. These and other modules can control or be configured to control the processor 730 to perform various actions. Other system memory 704 may be available for use as well. The memory 704 may include multiple different types of memory with different performance characteristics. The processor 730 may include any general purpose processor and a hardware module or software module, such as module 1 714, module 2 716, and module 3 718 embedded in storage device 712. The hardware module or software module is configured to control the processor 730, as well as a special-purpose processor where software instructions are incorporated into the actual processor design. The processor 1130 may essentially be a completely self-contained computing system, containing multiple cores or processors, a bus, memory controller, cache, etc. A multi-core processor may be symmetric or asymmetric.

To enable user interaction with the computing device 700, an input device 720 is provided as an input mechanism. The input device 720 can comprise a microphone for speech, a touch-sensitive screen for gesture or graphical input, keyboard, mouse, motion input, and so forth. In some instances, multimodal systems can enable a user to provide multiple types of input to communicate with the system 700. In this example, an output device 722 is also provided. The communications interface 724 can govern and manage the user input and system output.

Storage device 712 can be a non-volatile memory to store data that are accessible by a computer. The storage device 712 can be magnetic cassettes, flash memory cards, solid state memory devices, digital versatile disks, cartridges, random access memories (RAMs) 708, read only memory (ROM) 706, and hybrids thereof.

The controller 710 can be a specialized microcontroller or processor on the system 700, such as a BMC (baseboard management controller). In some cases, the controller 710 can be part of an Intelligent Platform Management Interface (IPMI). Moreover, in some cases, the controller 710 can be embedded on a motherboard or main circuit board of the system 700. The controller 710 can manage the interface between system management software and platform hardware. The controller 710 can communicate with various system devices and components (internal and/or external), such as controllers or peripheral components, as further described below.

The controller 710 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 710 to initiate or conduct specific hardware recovery procedures or operations, as further described below.

The controller 710 can also include a system event log controller and/or storage for managing and maintaining events, alerts, and notifications received by the controller 710. For example, the controller 710 or a system event log controller can receive alerts or notifications from one or more devices and components and maintain the alerts or notifications in a system event log storage component.

Flash memory 732 can be an electronic non-volatile computer storage medium or chip that can be used by the system 700 for storage and/or data transfer. The flash memory 732 can be electrically erased and/or reprogrammed. Flash memory 732 can include EPROM (erasable programmable read-only memory), EEPROM (electrically erasable programmable read-only memory), ROM, NVRAM, or CMOS (complementary metal-oxide semiconductor), for example. The flash memory 732 can store the firmware 734 executed by the system 700 when the system 700 is first powered on, along with a set of configurations specified for the firmware 734. The flash memory 732 can also store configurations used by the firmware 734.

The firmware 734 can include a Basic Input/Output System or equivalents, such as an EFI (Extensible Firmware Interface) or UEFI (Unified Extensible Firmware Interface). The firmware 734 can be loaded and executed as a sequence program each time the system 700 is started. The firmware 734 can recognize, initialize, and test hardware present in the system 700 based on the set of configurations. The firmware 734 can perform a self-test, such as a POST (Power-on-Self-Test), on the system 700. This self-test can test the functionality of various hardware components such as hard disk drives, optical reading devices, cooling devices, memory modules, expansion cards, and the like. The firmware 734 can address and allocate an area in the memory 704, ROM 706, RAM 708, and/or storage device 712, to store an operating system (OS). The firmware 734 can load a boot loader and/or OS and give control of the system 700 to the OS.

The firmware 734 of the system 700 can include a firmware configuration that defines how the firmware 734 controls various hardware components in the system 700. The firmware configuration can determine the order in which the various hardware components in the system 700 are started. The firmware 734 can provide an interface, such as an UEFI, that allows a variety of different parameters to be set, which can be different from parameters in a firmware default configuration. For example, a user (e.g., an administrator) can use the firmware 734 to specify clock and bus speeds; define what peripherals are attached to the system 700; set monitoring of health (e.g., fan speeds and CPU temperature limits); and/or provide a variety of other parameters that affect overall performance and power usage of the system 700. While firmware 734 is illustrated as being stored in the flash memory 732, one of ordinary skill in the art will readily recognize that the firmware 734 can be stored in other memory components, such as memory 704 or ROM 706.

The system 700 can include one or more sensors 726. The one or more sensors 726 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 726 can communicate with the processor, cache 728, flash memory 732, communications interface 724, memory 704, ROM 706, RAM 708, controller 710, and storage device 712, via the bus 702, for example. The one or more sensors 726 can also communicate with other components in the system via one or more different means, such as inter-integrated circuit (I2C), general purpose output (GPO), and the like. Different types of sensors (e.g., sensors 726) on the system 700 can also report to the controller 710 on parameters, such as cooling fan speeds, power status, operating system (OS) status, hardware status, and so forth. A display 736 may be used by the 700 to provide graphics related to the applications that are executed by the controller 710, or the processor 730.

Figure 8:
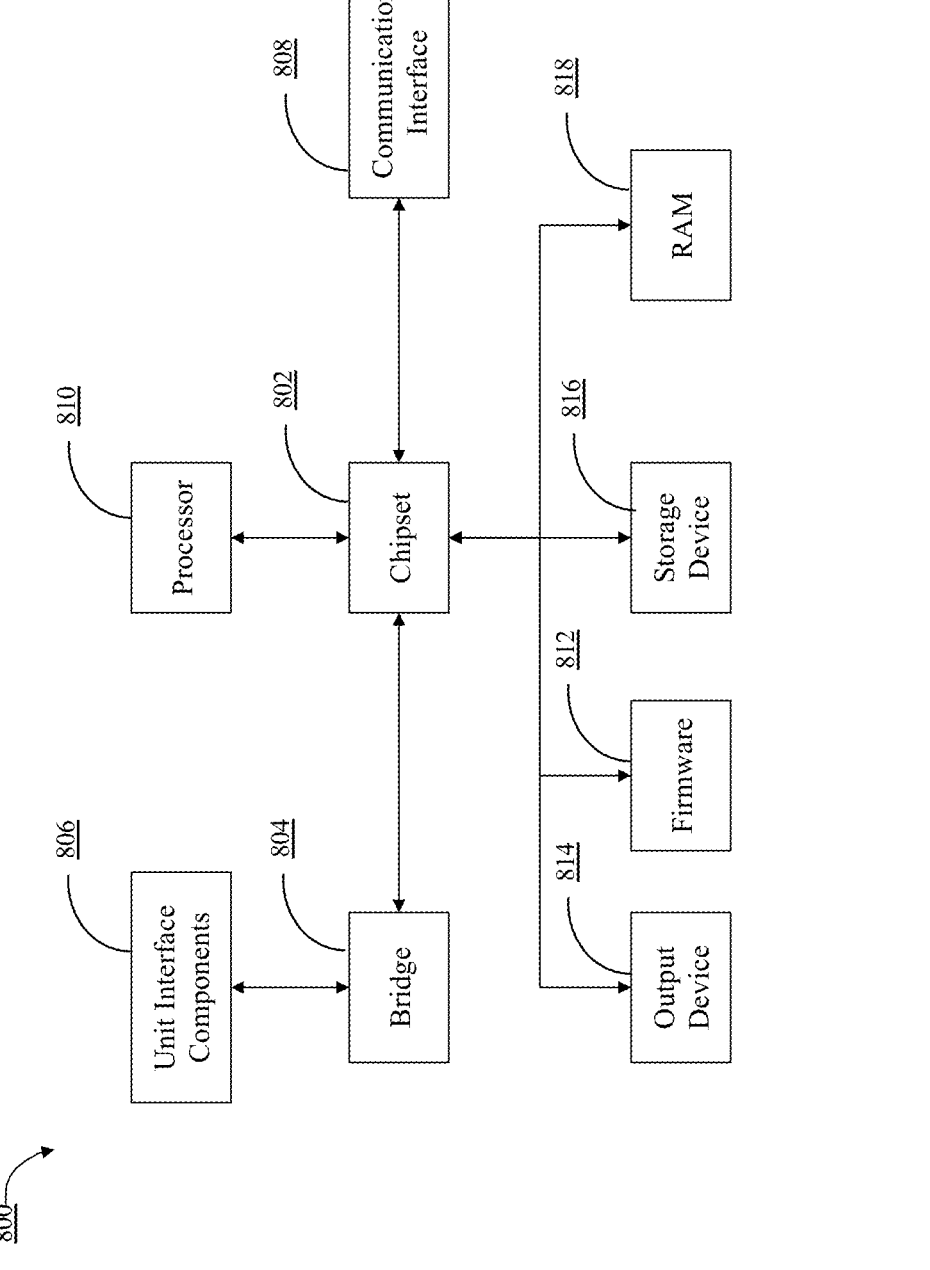
FIG. 8 illustrates an exemplary computer system, according to some embodiments of the present invention.

FIG. 8 illustrates an exemplary computer system 800, according to some embodiments of the present invention. The system 800 having a chipset architecture that can be used in executing the described method(s) or operations and generating and displaying a graphical user interface (GUI). Computer system 800 can include computer hardware, software, and firmware that can be used to implement the disclosed technology. System 800 can include a processor 810, representative of a variety of physically and/or logically distinct resources capable of executing software, firmware, and hardware configured to perform identified computations. Processor 810 can communicate with a chipset 802 that can control input to and output from processor 810. In this example, chipset 802 outputs information to output device 814, such as a display, and can read and write information to storage device 816. The storage device 816 can include magnetic media, and solid-state media, for example. Chipset 802 can also read data from and write data to RAM 818. A bridge 804 for interfacing with a variety of user interface components 806, can be provided for interfacing with chipset 802. User interface components 806 can include a keyboard, a microphone, touch detection and processing circuitry, and a pointing device, such as a mouse.

Chipset 802 can also interface with one or more communication interfaces 808 that can have different physical interfaces. Such communication interfaces can include interfaces for wired and wireless local area networks, for broadband wireless networks, and for personal area networks. Further, the machine can receive inputs from a user via user interface components 806, and execute appropriate functions, such as browsing functions by interpreting these inputs using processor 810.

Moreover, the chipset 802 can also communicate with firmware 812, which can be executed by the computer system 800 when powering on. The firmware 812 can recognize, initialize, and test hardware present in the computer system 800 based on a set of firmware configurations. The firmware 812 can perform a self-test, such as a POST, on the system 800. The self-test can test the functionality of the various hardware components 802-818. The firmware 812 can address and allocate an area in the RAM memory 818 to store an OS. The firmware 812 can load a boot loader and/or OS and give control of the system 800 to the OS. In some cases, the firmware 812 can communicate with the hardware components 802-810 and 814-818. Here, the firmware 812 can communicate with the hardware components 802-810 and 814-818 through the chipset 802, and/or through one or more other components. In some cases, the firmware 812 can communicate directly with the hardware components 802-810 and 814-818.

It can be appreciated that example systems 800 and 800 can have more than one processor (e.g., 810), or be part of a group or cluster of computing devices networked together to provide greater processing capability.

Embodiments of the present disclosure provide the processor 810 in communication with the memory. The processor 810 may be configured to preprocess the plurality of input documents into the structured, standardized format for comparison. Further, the processor 810 may be configured to generate the layout indicative of an arrangement of one or more components in each of the plurality of input documents using the AI model, based on parsing the one or more components. Furthermore, the processor 810 may be configured to generate the canonical representation based on the layout, wherein the canonical representation indicates relationships between the one or more components of each of the plurality of input documents. Furthermore, the processor 810 may be configured to determine the plurality of sections within each of the plurality of input documents by segmenting the layout based on the canonical representation, wherein the plurality of sections indicates logical units in the corresponding input document of the plurality of input documents. Furthermore, the processor 810 may be configured to determine the textual difference matrix using the AI model, based on the comparison of the plurality of sections within each of the plurality of input documents, wherein the textual difference matrix indicates the alteration in one or more expressions in each of the plurality of sections.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

We claim:

1. A method for comparing documents using an artificial intelligence (AI) model, the method comprising:
preprocessing a plurality of input documents into a structured, standardized format for comparison;
generating a layout indicative of an arrangement of one or more components in each of the plurality of input documents using the AI model, based on parsing the one or more components,
wherein generating the layout comprises:
predicting a positional coordinate corresponding to each of the one or more components for each of the plurality of input documents, wherein predicting the positional coordinate comprises:
training the AI model with an annotated plurality of training documents based on at least one of a precision value, a recall value, and a Mean Average Precision (mAP) value associated with the AI model;
determining hyperparameters associated with the annotated plurality of training documents based on the training;
learning the positional coordinate corresponding to the one or more components in the plurality of training documents based on the determined hyperparameters; and
predicting the positional coordinate corresponding to the one or more components for each of the plurality of input documents based on the learning;

parsing each of the one or more components in each of the plurality of input documents based on the positional coordinate to each of the one or more components; and generating the layout for each of the plurality of input documents based on the parsing;

generating a canonical representation based on the layout, wherein the canonical representation indicates relationships between the one or more components of each of the plurality of input documents;

determining a plurality of sections within each of the plurality of input documents by segmenting the layout based on the canonical representation, wherein the plurality of sections indicates logical units in the corresponding input document of the plurality of input documents; and determining a textual difference matrix using the AI model, based on a comparison of the plurality of sections within each of the plurality of input documents, wherein the textual difference matrix indicates an alteration in one or more expressions in each of the plurality of sections.

2. The method of claim 1, further comprising:

highlighting the alteration in the one or more expressions; and displaying the highlighted alteration in each of the plurality of input documents such that the highlighted alteration indicates differences between the plurality of input documents.

3. The method of claim 1, wherein determining the plurality of sections within each of the plurality of input documents comprises:

identifying a heading component among the one or more components based on an iteration for each of the one or more components;

determining a section-start value upon identifying the heading component; and determining the plurality of sections within each of the plurality of input documents based on the section-start value to be one of true or false.

4. The method of claim 3, wherein when the section-start value is true indicates that a section is in progress, and when the section-start value is false indicates start of another section.

5. The method of claim 1, wherein determining the textual difference matrix comprises:

obtaining a sequence of text from each of the plurality of sections within each of the plurality of input documents;

comparing the sequence of text to identify the alteration between the sequence of text between each of the corresponding plurality of sections, wherein the alteration indicates at least one of an insertion and a deletion in one or more expressions in the sequence of text;

creating a change log indicative of a list of alterations between the sequence of text on each page and on each of the plurality of sections within each of the plurality of input documents;

determining a set of coordinates associated with the plurality of sections within each of the plurality of input documents based on the change log and the comparison of the sequence of text; and determining the textual difference matrix based on the set of coordinates, such that the textual difference matrix provides location of the alteration in each of the plurality of sections.

6. The method of claim 5, further comprising:

generating an identification boundary based on the set of coordinates surrounding the identified altered sequence of text in each of the plurality of sections within each of the plurality of input documents.

7. A system for comparing documents using an artificial intelligence (AI) model, the system comprising:

a memory; and at least one processor in communication with the memory, wherein the at least one processor is configured to:

preprocess a plurality of input documents into a structured, standardized format for comparison;

generate a layout indicative of an arrangement of one or more components in each of the plurality of input documents using the AI model, based on parsing the one or more components, wherein to generate the layout, the at least one processor is configured to:

predict a positional coordinate corresponding to each of the one or more components for each of the plurality of input documents, wherein to predict the positional coordinate, the at least one processor is configured to:

train the AI model with an annotated plurality of training documents based on at least one of a precision value, a recall value, and a Mean Average Precision (mAP) value associated with the AI model;

determine hyperparameters associated with the annotated plurality of training documents based on the training;

learn the positional coordinate corresponding to the one or more components in the plurality of training documents based on the determined hyperparameters; and predict the positional coordinate corresponding to the one or more components for each of the plurality of input documents based on the learning;

parse each of the one or more components in each of the plurality of input documents based on the positional coordinate to each of the one or more components; and generate the layout for each of the plurality of input documents based on the parsing;

generate a canonical representation based on the layout, wherein the canonical representation indicates relationships between the one or more components of each of the plurality of input documents;

determine a plurality of sections within each of the plurality of input documents by segmenting the layout based on the canonical representation, wherein the plurality of sections indicate logical units in the corresponding input document of the plurality of input documents; and determine a textual difference matrix using the AI model, based on a comparison of the plurality of sections within each of the plurality of input documents, wherein the textual difference matrix indicates an alteration in one or more expressions in each of the plurality of sections.

8. The system of claim 7, wherein the at least one processor is further configured to:

highlight the alteration in the one or more expressions; and display the highlighted alteration in each of the plurality of input documents such that the highlighted alteration indicates differences between the plurality of input documents.

9. The system of claim 7, wherein to determine the plurality of sections within each of the plurality of input documents, the at least one processor is configured to:

identify a heading component among the one or more components based on an iteration for each of the one or more components;

determine a section-start value upon identifying the heading component; and determine the plurality of sections within each of the plurality of input documents based on the section-start value to be one of true or false.

10. The system of claim 9, wherein when the section-start value is true indicates that a section is in progress, and when the section-start value is false indicates start of another section.

11. The system of claim 7, wherein to determine the textual difference matrix, the at least one processor is configured to:

obtain a sequence of text from each of the plurality of sections within each of the plurality of input documents;

compare the sequence of text to identify the alteration between the sequence of text between each of the corresponding plurality of sections, wherein the alteration indicates at least one of an insertion and a deletion in one or more expressions in the sequence of text;

create a change log indicative of a list of alterations between the sequence of text on each page and on each of the plurality of sections within each of the plurality of input documents;

determine a set of coordinates associated with the plurality of sections within each of the plurality of input documents based on the change log and the comparison of the sequence of text; and determine the textual difference matrix based on the set of coordinates, such that the textual difference matrix provides location of the alteration in each of the plurality of sections.

12. The system of claim 11, wherein the at least one processor is further configured to:

generate an identification boundary based on the set of coordinates surrounding the identified altered sequence of text in each of the plurality of sections within each of the plurality of input documents.

* * * * *